US010557465B2

(12) United States Patent
Fremy et al.

(10) Patent No.: US 10,557,465 B2
(45) Date of Patent: Feb. 11, 2020

(54) PERISTALTIC PUMP TUBE WITH NON-UNIFORM LUMEN PROFILE

(71) Applicant: SAINT-GOBAIN PERFORMANCE PLASTICS CORPORATION, Solon, OH (US)

(72) Inventors: Flavien Fremy, Brookline, MA (US); Alban Letailleur, Paris (FR); Charles S. Golub, Westford, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 193 days.

(21) Appl. No.: 15/493,402

(22) Filed: Apr. 21, 2017

(65) Prior Publication Data

US 2017/0314544 A1 Nov. 2, 2017

Related U.S. Application Data

(60) Provisional application No. 62/329,811, filed on Apr. 29, 2016.

(51) Int. Cl.
  *F16L 11/00* (2006.01)
  *F04B 43/00* (2006.01)
  *F04B 45/06* (2006.01)
  *F16L 11/12* (2006.01)

(52) U.S. Cl.
  CPC .......... *F04B 43/0072* (2013.01); *F04B 45/06* (2013.01); *F16L 11/121* (2013.01)

(58) Field of Classification Search
  CPC ...... F04B 43/0072; F04B 45/06; F04B 43/08; F16L 11/121

USPC .......................................... 138/119, DIG. 11
See application file for complete search history.

(56) References Cited

U.S. PATENT DOCUMENTS

| | | | | |
|---|---|---|---|---|
| 2,228,076 A | * | 1/1941 | Flavin | F16L 9/21 138/101 |
| 3,343,567 A | * | 9/1967 | Mulligan | B29C 47/0026 138/119 |
| 3,508,587 A | * | 4/1970 | Mauch | F16L 11/121 138/119 |
| 3,603,905 A | * | 9/1971 | Schuttloffel | H01P 3/14 138/121 |
| 3,720,235 A | * | 3/1973 | Schrock | F16L 11/121 128/204.18 |

(Continued)

FOREIGN PATENT DOCUMENTS

| WO | 9511383 A1 | 4/1995 |
|---|---|---|
| WO | 2017189345 A1 | 11/2017 |

OTHER PUBLICATIONS

Bertoldi, K. et al., "Negative Poisson's Ratio Behavior Induced by an Elastic Instability," 2009, Adv. Mater. vol. 21, No. 1.

(Continued)

*Primary Examiner* — James F Hook
(74) *Attorney, Agent, or Firm* — Abel Schillinger, LLP; Chi Suk Kim

(57) ABSTRACT

A tube can include a sidewall defining a lumen profile. The sidewall can include a plurality of alternating thin regions and thick regions. The lumen profile can include a plurality of alternating large radius and small radius regions. The thin regions or large radius regions can include elastic instabilities adapted to form an essentially complete closure of the lumen profile at minimal compression.

20 Claims, 6 Drawing Sheets

(56) References Cited

U.S. PATENT DOCUMENTS

| | | | | |
|---|---|---|---|---|
| 3,721,269 A * | 3/1973 | Choate | B29C 48/03 | 138/119 |
| 3,792,386 A * | 2/1974 | Schuster | H01P 3/14 | 333/241 |
| 4,131,399 A * | 12/1978 | Calvet | F04B 43/0072 | 417/477.12 |
| 4,257,422 A * | 3/1981 | Duncan | A61M 27/00 | 138/103 |
| 5,048,572 A * | 9/1991 | Levine | B29C 61/0608 | 138/121 |
| 5,067,879 A * | 11/1991 | Carpenter | F04B 43/0072 | 138/119 |
| 5,088,522 A | 2/1992 | Rath et al. | | |
| 5,215,450 A | 6/1993 | Tamari | | |
| 5,224,796 A * | 7/1993 | Zeman | A01G 25/02 | 138/115 |
| 5,561,453 A | 10/1996 | Shibata et al. | | |
| 5,662,144 A | 9/1997 | Lo et al. | | |
| 7,322,379 B2 * | 1/2008 | Evans | F16L 11/121 | 138/114 |
| 8,146,620 B2 * | 4/2012 | Lupke | F16L 11/121 | 138/109 |
| 9,220,863 B2 * | 12/2015 | Porat | A61M 39/08 | |
| 2001/0054449 A1 * | 12/2001 | Jones | B22D 13/02 | 138/38 |
| 2003/0138335 A1 * | 7/2003 | Doi | F04B 43/0072 | 417/477.12 |
| 2004/0039351 A1 * | 2/2004 | Barrett | A61M 1/008 | 604/272 |
| 2004/0096348 A1 * | 5/2004 | Doig | F04B 43/0072 | 417/477.1 |
| 2005/0087251 A1 * | 4/2005 | Sumitomo | F16L 11/121 | 138/177 |
| 2005/0115622 A1 * | 6/2005 | Bennett | F16L 11/121 | 138/119 |
| 2008/0188789 A1 | 8/2008 | Galavotti et al. | | |
| 2009/0217879 A1 * | 9/2009 | Weisel | A01J 5/044 | 119/14.01 |
| 2010/0006171 A1 * | 1/2010 | Tomlin | C09K 11/00 | 138/104 |
| 2010/0200100 A1 * | 8/2010 | Lupke | F16L 11/121 | 138/121 |
| 2011/0178457 A1 * | 7/2011 | Kuebler | A61M 1/0031 | 604/22 |
| 2013/0247904 A1 * | 9/2013 | Porat | A61M 39/08 | 128/200.24 |
| 2014/0037479 A1 | 2/2014 | Klein | | |
| 2014/0271293 A1 | 9/2014 | Gledhill, III et al. | | |

OTHER PUBLICATIONS

Shim, J. et al., "Buckling induced encapsulation of structured elastic shells under pressure," 2012, Proc. Natl. Acad. Sci. U.S.A. vol. 109, No. 16.

International Search Report and Written Opinion for PCT/US2017/028743, dated Jul. 21, 2017, 13 pages.

* cited by examiner

PERISTALTIC PUMP TUBE WITH NON-UNIFORM LUMEN PROFILE

CROSS-REFERENCE TO RELATED APPLICATION(S)

This application claims priority under 35 U.S.C. § 119(e) to U.S. Patent Application No. 62/329,811 entitled "PERISTALTIC PUMP TUBE WITH NON-UNIFORM LUMEN PROFILE," by Flavien Fremy, Alban Letailleur and Charles S. Golub, filed Apr. 29, 2016, which is assigned to the current assignee hereof and incorporated herein by reference in its entirety.

FIELD OF THE DISCLOSURE

The present disclosure relates to tube having improved flow and compression characteristics.

BACKGROUND

Peristaltic tubes can be exposed to compression forces that cause failure due to internal stresses and spallation. The stresses can be concentrated at the sides of the tube where the failure typically takes place. There exists a need for an improved tube adapted to resist failure due to compression.

BRIEF DESCRIPTION OF THE DRAWINGS

Embodiments are illustrated by way of example and are not limited in the accompanying figures.

Figure 1:
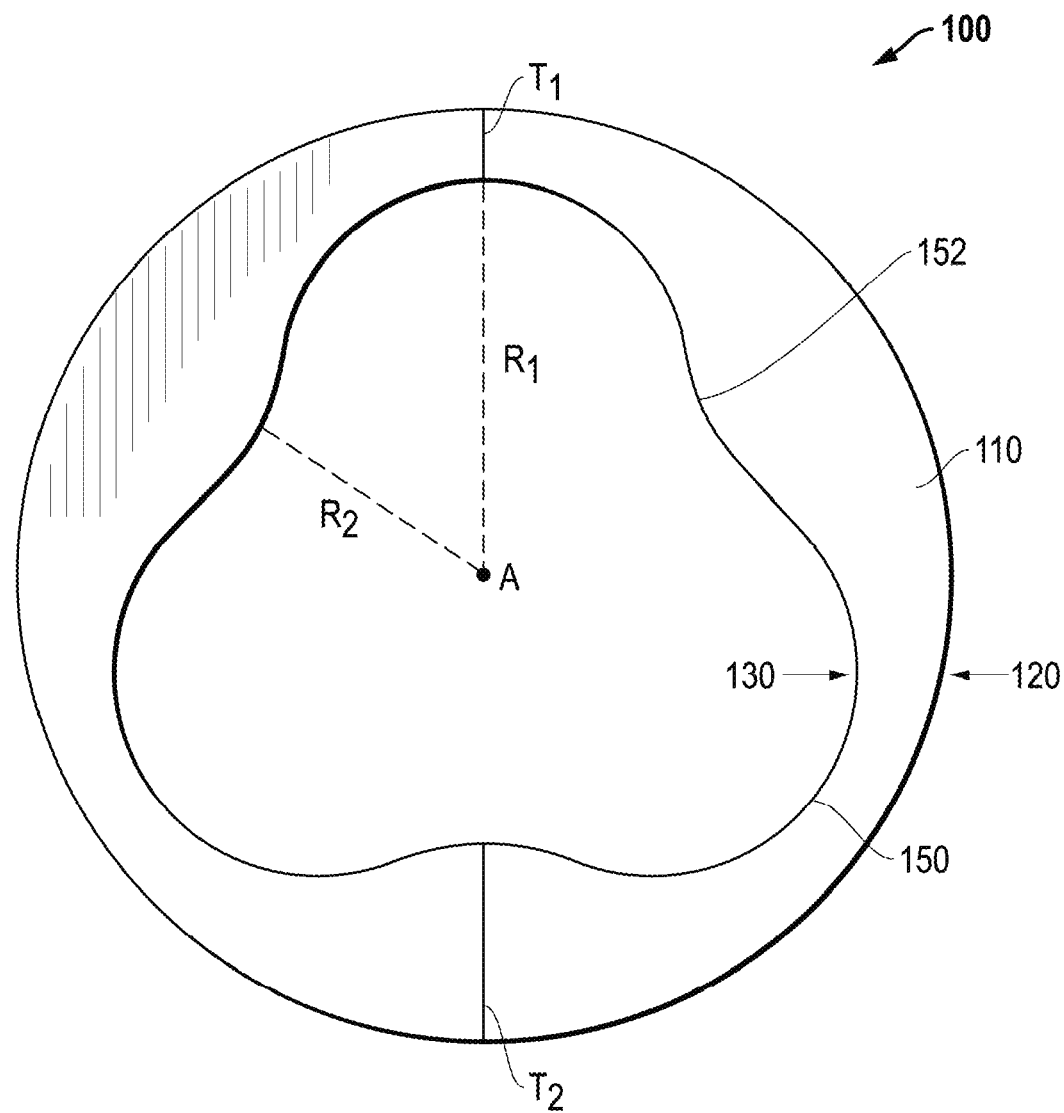
FIG. 1 includes an illustration of a lumen profile according to certain embodiments disclosed herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid transport arts.

A tube exposed to compression forces can fail due to internal stresses and spallation, and the stresses can be concentrated at the sides of the tube where the failure typically takes place. For example, a peristaltic pump is a positive displacement pump that can include a flexible tube and a compression device that can continuously apply and withdraw a compression force to collapse and expand the flexible tube to advance fluid through the flexible tube.

The flexible tube needs to be compressed to closure to prevent the fluid from slipping back and decreasing the efficiency of the pump. However, the amount of force necessary to collapse the tube to closure can cause the tube to fail due to internal stresses and spallation, and the stresses can be concentrated at the sides of the tube where the failure typically takes place.

It is an advantage of certain embodiments of the flexible tube described herein to have an increased capability to endure repeated compression forces. For example, it is an advantage of certain embodiments of the flexible tube to form a complete occlusion at a minimal compression force. Further, it is an advantage of certain embodiments of the flexible tube to withstand an increased number of compressions without failure. Furthermore, it is an advantage of certain embodiments of the flexible tube to provide an improved flow rate. The concepts are better understood in view of the embodiments described below that illustrate and do not limit the scope of the present invention.

FIG. 1 includes a cross-section of a tube 100 according to certain embodiments described herein. As illustrated in FIG. 1, the cross-section of the tube 100 can include a sidewall 110 having a thickness T and defining an outer diameter 120 and a lumen profile 130. The lumen profile 130 can define a lumen 140 of the tube 100. As used herein, the term "lumen profile" refers to the shape of the cross-section of the inner surface of a tube sidewall that defines a lumen of a tube. In certain embodiments, the lumen profile 130 can define a central lumen profile. In further embodiments, the lumen 140 can have a central axis A.

Generally speaking, the tube 100 can have a length extending from a first end to an opposite second end. In certain embodiments, the tube 100 can have a substantially continuous lumen profile along the length of the tube 100. That is, when a cross-section is taken at any point along the length of the tube 100, the sidewall 110 will generally have the same thickness T, outer diameter 120, and lumen profile 130. In other embodiments, the tube 100 can have a substantially non-continuous lumen profile along the length of the tube 100, such that the lumen profile at different points along the length can have a different thickness T, a different outer diameter 120, a different lumen profile 130, or any combination thereof.

In certain embodiments, the lumen profile 130 of the tube can have a contour. As used herein, the term "contour" refers to a surface that exhibits a predetermined unevenness of surface. In certain embodiments, the lumen profile 130 can have axial asymmetry or, in other words, the lumen profile does not have axial symmetry. In particular embodiments, however, the can have rotational symmetry. As used herein, the term "axial symmetry" refers to a form that appears substantially the same when rotated by any angle about a central axis. As used herein, the term "rotational symmetry" refers to a form that appears substantially the same only after a certain amount of rotation about a central axis, such as at 30° rotations, 45° rotations, 90° rotations, 180° rotations, etc.

In certain embodiments, the sidewall 110 or contour of the lumen profile 130 can define a plurality of elastic instabilities 150. As used herein, the term "elastic instability" refers to a predetermined point on the flexible tube that causes preferential buckling. As used herein, the term "preferential buckling" refers to a buckling that occurs more readily at a predetermined point on the lumen profile as compared to other points on the lumen profile.

In certain embodiments, the thickness T of the sidewall 110 can define a plurality of elastic instabilities 150 comprising areas of reduced thickness in the sidewall, referred to herein as thin regions or grooves. In further embodiments, the sidewall can include a plurality of areas of increased thickness 152, referred to herein as thick regions or ridges. The thickness T of the sidewall 110 can vary depending on the point at which the thickness T is measured. The grooves can have a thickness $T_1$ less than the average thickness and the ridges can have a thickness $T_2$ greater than the average thickness.

In certain embodiments, the thickness $T_1$ may be no greater than 50% of the thickness $T_2$, such as no greater than 30% of the thickness $T_2$, or even no greater than 10% of the thickness $T_2$. In particular embodiments, the thickness $T_1$ may be no greater than 0.06 cm, no greater than 0.05 cm, or even no greater than 0.04 cm. In more particular embodiments, the thickness $T_2$ can be at least 0.2 cm, at least 0.3 cm, or even at least 0.35 cm. In further embodiments, the average thickness can be in a range of about 0.1 cm to about 0.15 cm, such as in a range of about 0.12 cm to about 0.14 cm.

The shape of a groove can be one of a variety of shapes depending on the desired application. For example, the groove can have a geometric shape or an arcuate shape. In particular embodiments, the groove can have a concave shape having an apex extending away from the central axis.

The shape of a ridge can be one of a variety of shapes depending on the desired application. For example, the ridge can have a geometric shape or an arcuate shape. In particular embodiments, the ridge can have a convex shape having a curved apex extending away toward the central axis.

In certain embodiments, the sidewall 110 can define a plurality of grooves alternating with a plurality of ridges. In particular embodiments, the alternating contour can include a plurality of ridges having a convex shape alternating with a plurality of grooves having a concave shape. For example, a groove can transition into a ridge and back into a groove, and so forth, forming a wave pattern, such that the lumen profile 130 can be described as having a wavy contour.

Further, in certain embodiments, the radius of the lumen profile 130 can define a plurality of elastic instabilities 150 comprising areas of increased radius, referred to herein as enlargements. In further embodiments, the radius R of the lumen profile 130 can define a plurality of areas of decreased radius, referred to herein as reductions. As discussed above, the lumen 140 can a central axis A and a radius extending from the central axis to a point along the lumen profile 130. The radius of the lumen profile 130 can vary depending on the position of the point along the contour of the lumen profile 130. The enlargements can have a radius $R_1$ greater than the average radius $R_A$ and the reductions can have a radius $R_2$ less than the average radius.

In certain embodiments, the radius $R_2$ may be no greater than 50% of the radius $R_1$, such as no greater than 30% of the radius $R_1$, or even no greater than 10% of the radius $R_1$. In particular embodiments, the radius $R_2$ may be no greater than 0.4 cm, no greater than 0.3 cm, or even no greater than 0.2 cm. In more particular embodiments, the radius $R_1$ can be at least 0.7 cm, at least 0.8 cm, or even at least 0.9 cm. In further embodiments, the average thickness $T_A$ can be in a range of about 0.5 cm to about 0.6 cm, such as in a range of about 0.52 cm to about 0.58 cm.

In certain embodiments, the enlargement and reductions can correspond to grooves and ridges, respectively. In further embodiments, the enlargements and reductions can have any of the same shapes described above for the grooves and ridges. Further, in certain embodiments, the enlargements and reductions can define any of the same contours described above for the grooves and ridges. For example, the enlargements and reductions can define a wavy contour.

In certain embodiments, a groove can be disposed diametrically opposite a ridge such that, when the tube is compressed, the groove can receive the ridge. Similarly, in further embodiments, an enlargement can be disposed diametrically opposite a reduction such that, when the tube is compressed, the enlargement can receive the reduction.

The outer diameter 120 of the tube 100 can have any shape appropriate for the desired application, such as a geometric shape, an arcuate shape, or the outer perimeter can be amorphous. In certain embodiments, outer diameter 120 can be smooth and have an arcuate shape. In particular embodiments, the outer diameter 120 can have a circular shape.

In certain embodiments, the outer diameter 120 and the lumen profile 130 can be coaxial. In other embodiments, the outer diameter 120 and the lumen profile 130 may not be coaxial.

In certain embodiments, the outer diameter 120 can have a diameter of at least 0.2 cm, at least 0.25 cm, at least 3 cm, or at least 0.35 cm. In certain embodiments, the outer diameter 120 may have a diameter of no greater than 1 cm, no greater than 0.95 cm, or even no greater than 0.9 cm. Moreover, in certain embodiments, the outer diameter 120 can have a diameter in a range of 0.2 to 1 cm, 0.3 to 0.95 cm, or 0.35 to 0.9 cm. It is understood that diameters greater than or less than the above values are also encompassed by this disclosure.

Further, in certain embodiments, the outer diameter 120 and lumen profile 130 can be incongruous. As used herein, the term "incongruous" or "incongruent" refers to a comparison of forms having different sizes and shapes, meaning form A is incongruous with form B if form A is a different shape and size relative to form B. By contrast, for the purposes of this disclosure, the term "congruous" or "congruent" refers to forms having the same shape and size. Further, for the purposes of this disclosure, the term "similar," at least when referring to shapes, refers to forms having the same shape but different sizes. Thus, forms that are not congruent are not necessarily incongruent. For example, if form A has the same shape as form B but has a different size, the forms are similar and not incongruent. Form A and form B are incongruent only when the shape and the size are different. In particular embodiments, the outer diameter 120 can have a uniform contour with axial symmetry and the lumen profile 130 can have an axially asymmetric contour comprising a plurality of elastic instabilities 150, such as grooves or enlargements.

Figure 2:
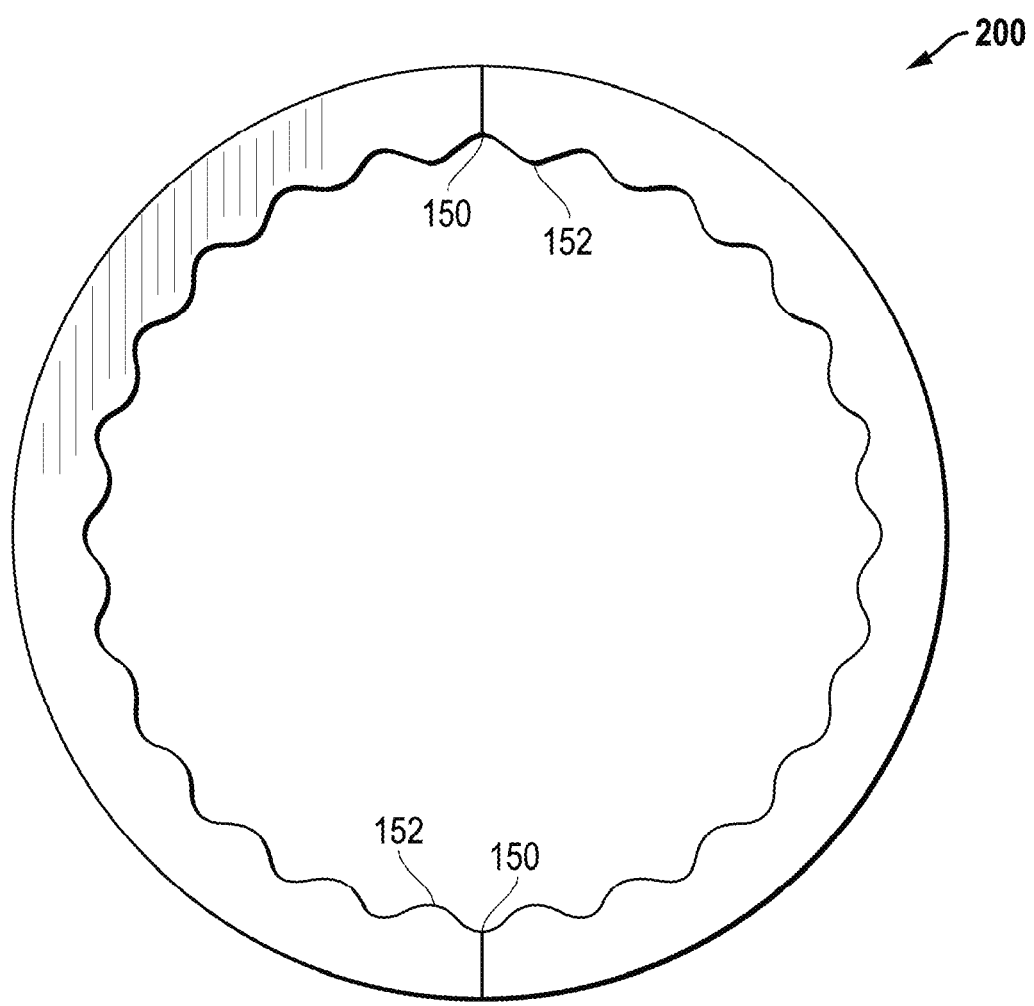
FIG. 2 includes an illustration of a lumen profile according to certain embodiments disclosed herein.
Figure 3:
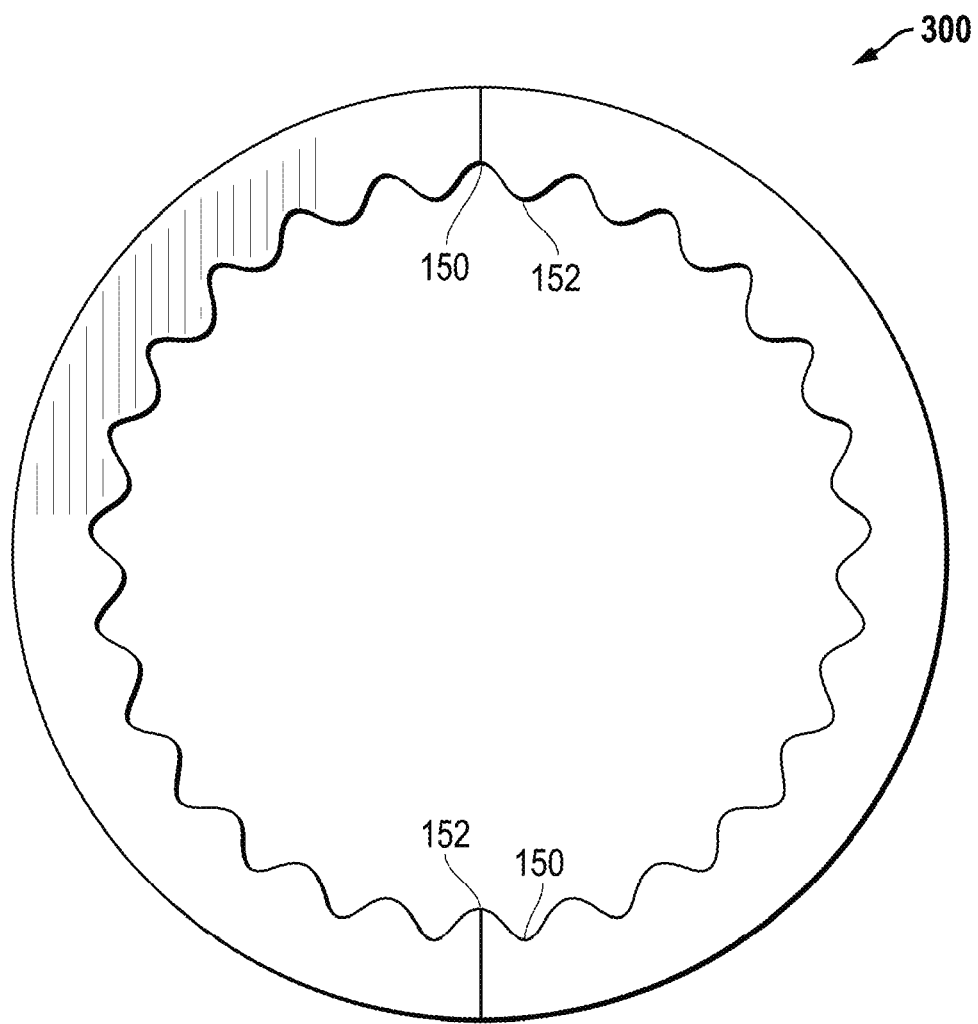
FIG. 3 includes an illustration of a lumen profile according to certain embodiments disclosed herein.

Referring to FIGS. 1, 2, and 3, in particular embodiments, the lumen profile 130 can include a wavy contour including a plurality of elastic instabilities 150 separated by ridges or reductions. As illustrated in FIG. 1, in certain embodiments, the tube 100 can have a lumen profile having a wavy contour that includes at least 3 elastic instabilities 150 separated by ridges or reductions 152. In FIG. 1, the elastic instabilities 150 are diametrically opposite to the ridges or reductions 152. As illustrated in FIG. 2, in certain embodiments, the wavy contour can include an increased number of elastic instabilities 150 separated by ridges or reductions 152, such as at least 8 elastic instabilities, at least 16 elastic instabilities, or even at least 24 elastic instabilities in a wavy contour. In FIG. 2, the tube 200 has a lumen profile with an even number of the elastic instabilities 150 and they are diametrically opposite to other elastic instabilities 150. The embodiment illustrated in FIG. 3 is similar to the embodiment illustrated in FIG. 2, except that the tube 300 has an odd number of the elastic instabilities and they are diametrically opposite to ridges or reductions 152.

Figure 4:
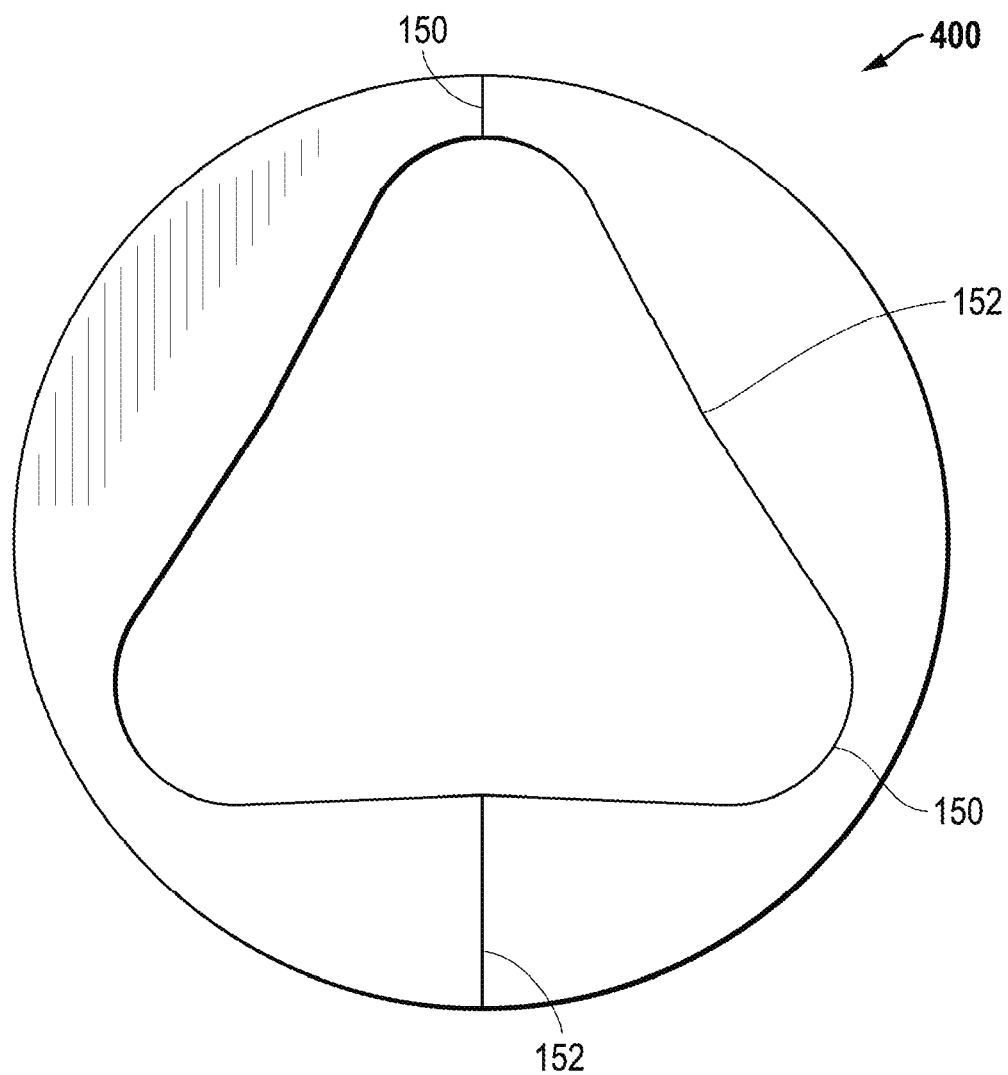
FIG. 4 includes an illustration of a lumen profile according to certain embodiments disclosed herein.
Figure 5:
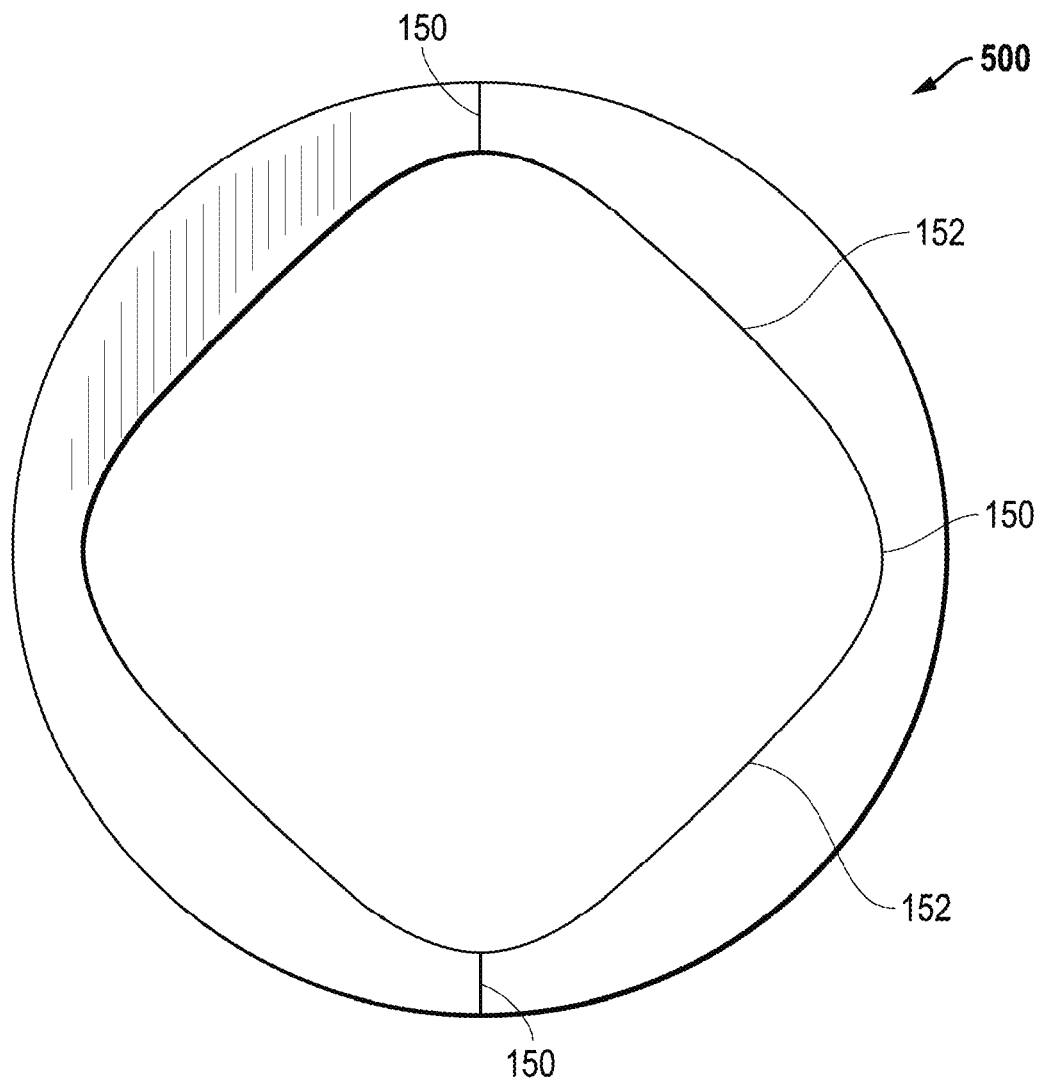
FIG. 5 includes an illustration of a lumen profile according to certain embodiments disclosed herein.
Figure 6:
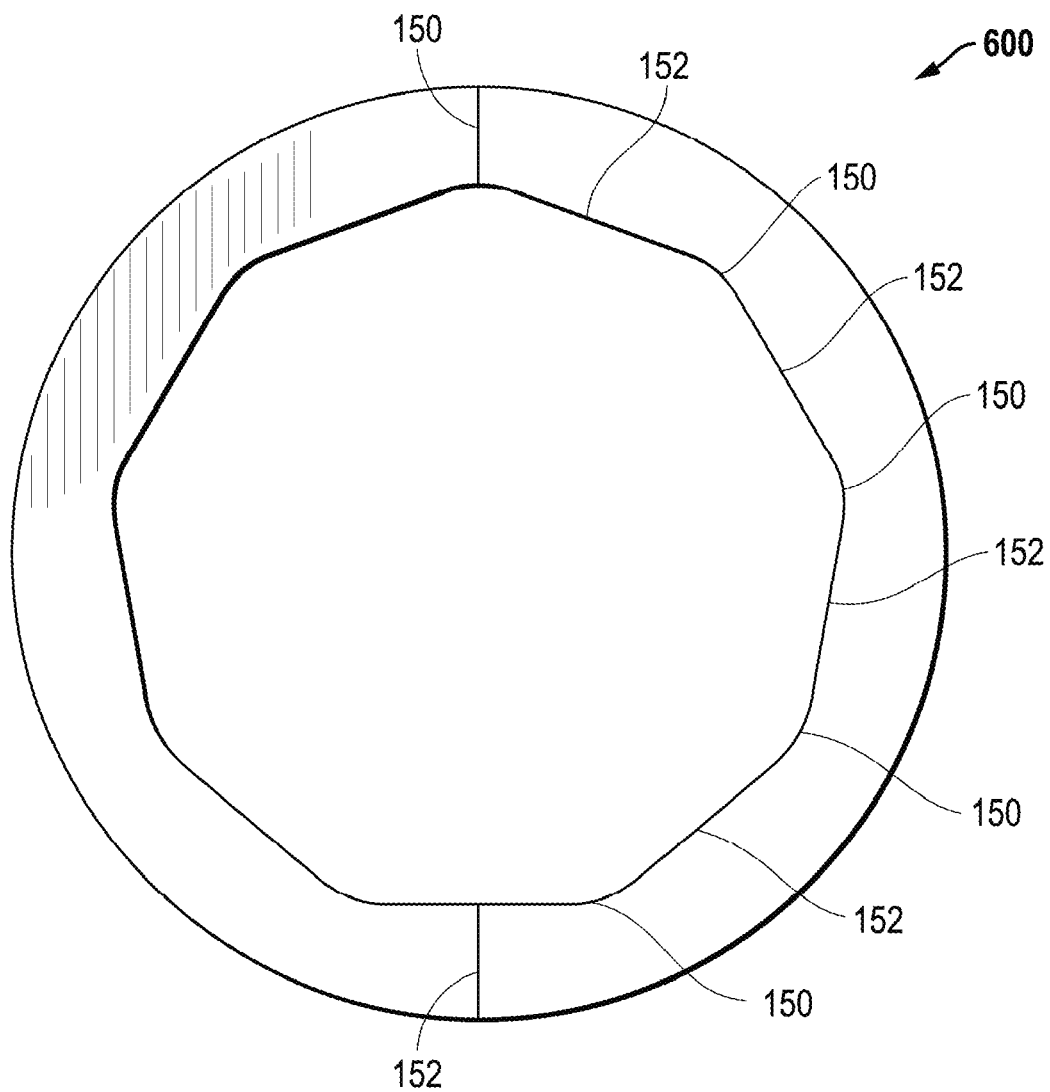
FIG. 6 includes an illustration of a lumen profile according to certain embodiments disclosed herein.

Referring to FIGS. 4, 5, and 6, in particular embodiments, the lumen profile 130 can have a generally geometric shape. In more particular embodiments, the geometric shape having relatively flat sides forming ridges or reductions and elastic instabilities 150 at the corners. In more particular embodiments, the corners can include rounded corners. As illustrated in FIG. 4, in certain embodiments, the tube 400 can have a lumen profile 130 having a triangle shape having three relatively flat sides forming ridges or reductions 152 that extend into three rounded corners forming elastic instabilities 150 that are diametrically opposite to the ridges or reductions 152. As illustrated in FIG. 5, in certain embodiments, the tube 500 can have a lumen profile 130 having a diamond or square shape having four relatively flat sides forming ridges or reductions that extend into four rounded corners forming elastic instabilities 150 that are diametrically opposite to other elastic instabilities 150. As illustrated in FIG. 6, in certain embodiments, the tube 600 can have a lumen profile 130 having a nonagonal shape having nine relatively flat sides forming ridges or reductions 152 that extend into nine rounded corners forming elastic instabilities 150 that are diametrically opposite to the ridges or reductions 152.

It is a particular advantage of certain embodiments of the tube described herein to exhibit low closure stress. The term "closure stress" refers to the simulated maximum tensile stress exhibited by the tube at essentially complete closure. The term "essentially complete closure" refers to a 15% compression after first touch of opposing portions of the lumen profile observed by a change of at least 20% in the slope of the stress/strain curve during compression.

The closure stress is measured according to the classical Finite Element Analysis method using Software Abaqus, version 13, which includes performing simulations of the lumen profile using perfectly elastic material to assess the impact of the lumen profile in the compression performance. In particular, the Finite Element Analysis method includes inputting the geometry of the subject tube with a particular lumen profile into a simulator. The simulator discretizes the tube geometry into a set of points connected together in a mesh of finite elements using the Galerkin method. The simulator then simulates an essentially complete closure of the tube (as defined above) and calculates the closure stress based on perfect elasticity using a set of finite sized matrix equations. Thus, the closure stress of the subject tube is a determined based on its geometry and independent of its materials.

In certain embodiments, the tube can have a closure stress of no greater than 0.96 times, no greater than 0.94 times, or no greater than 0.92 times the Elastic Modulus E of the material forming the tube, as defined in ASTM D 412 (Test Methods for Vulcanized Rubber and Thermoplastic Elastomers—Tension). In further embodiments, although it may desirable to have the closure stress as low as possible, the tube may have a closure stress of at least 0.5 times, at least 0.55 times, or at least 0.6 times the Elastic Modulus E of the material forming the tube, as defined in ASTM D 412 (Test Methods for Vulcanized Rubber and Thermoplastic Elastomers—Tension).

In certain embodiments, the closure stress of the tube can be measured in comparison to a circular reference tube made from the same material and having the same outer diameter and average wall thickness $T_2$. It is an advantage of certain embodiments disclosed herein that the tube can achieve an essentially complete closure while experiencing a closure stress of no greater than 96%, or no greater than 94%, or no greater than 92% of the closure stress of the circular reference tube.

In certain embodiments, the tube can have a contact stress corresponding to the first contact of two opposing portions of the sidewall during closure. As used herein, the term "contact stress" refers to the stress exhibited by the tube at the first contact of two opposite lips during closure. Contact stress, as used herein, is measured in the same manner as closure stress except that contact stress is measured at first contact of the opposing portions of the sidewall instead of at 15% compression after first touch of opposing portions. In certain embodiments, the contact stress can be no greater than 0.91 times, no greater than 0.85 times, or no greater than 0.73 times the Elastic Modulus E of the material forming the tube, as defined in ASTM D 412 (Test Methods for Vulcanized Rubber and Thermoplastic Elastomers—Tension). In further embodiments, although it may desirable to exhibit as little stress as possible, the tube may have a contact stress of at least 0.5 times, at least 0.55 times, or at least 0.6 times the Elastic Modulus E of the tube materials, as defined in ASTM D 412 (Test Methods for Vulcanized Rubber and Thermoplastic Elastomers—Tension).

In certain embodiments, the contact stress can be measured in comparison to a circular reference tube made from the same material and having the same outer diameter and average wall thickness $T_2$. It is an advantage of certain embodiments disclosed herein that the tube can exhibit a contact stress of no greater than 95%, or no greater than 89%, or no greater than 76% of the contact stress of the circular reference tube.

In certain embodiments, the lumen profile is adapted to increase the serviceable life of the tube as compared to conventional peristaltic pump tubes. As used herein, the term "serviceable life of the tube" refers to the number of pump hours the tube can withstand before the first observable leakage. The serviceable life of the tube can be measured according to the Pump Life Test, which includes pumping water through the tube at ambient conditions with no back pressure while subjecting the tube to repeated cycles of tube closure at a speed of about 600 rpm while measuring the flow rate at no compression (i.e. fully open state) using a standard flow meter at least until the first leakage is observed. In further embodiments, the tube can experience an increase of the serviceable life of the tube by at least about 30% or even by at least 100%, as compared to a reference circular tube made of the same material and having the same outer diameter and a wall thickness equal to the average wall thickness $T_2$. In further embodiments, the tube can experience an increase of the serviceable life of the tube of no greater than about 500% or no greater than 300%, as compared to the reference circular tube. The maximum limits are only illustrative embodiments and do not limit the scope of the improved performance of the tube.

In further embodiments, the tube can have a lumen profile adapted to have increased flow rate stability. Flow rate stability can be measured according to the Flow Rate Stability Test, which includes pumping water through the tube at ambient conditions with no back pressure while subjecting the tube to repeated cycles of tube closure at a speed of about 600 rpm and measuring the flow rate at no compression (i.e. fully open state) using a standard flow meter for at least 100 hours. Flow rate stability is determined by calculating the difference in flow rate at 0 hours and the flow rate at 100 hours. In certain embodiments, the tube can have a flow rate stability of no greater than 15%, no greater than 10%, or no greater than 5%, as measured according to the Flow Rate Stability Test. In certain embodiments, the tube can have a flow rate stability of at least 0.01% or at least greater than 0%, as measured according to the Flow Rate Stability Test. The minimum limits are only illustrative embodiments and do not limit the scope of the improved performance of the tube.

In certain embodiments, the tube can have a lumen profile adapted to have increased flow rate accuracy. Flow rate accuracy can be measured according to the Flow Rate Accuracy Test, which includes pumping water through the tube at ambient conditions with no back pressure while subjecting the tube to repeated cycles of tube closure at a speed of about 600 rpm and measuring the flow rate at zero compression (i.e. fully open state) using a standard flow meter for at least 10 minutes. The flow rate accuracy is determined by calculating the standard deviation in flow rate over the first 10 minutes. In certain embodiments, the tube can have a flow rate accuracy of at no greater than 2.5%, or no greater than 1%, or no greater than 0.2%, as measured according to the Flow Rate Accuracy Test. In certain embodiments, the tube can have a flow rate accuracy of at least 0.01% or at least greater than 0%, as measured according to the Flow Rate Accuracy Test. The minimum limits are only illustrative embodiments and do not limit the scope of the improved performance of the tube.

In certain embodiments, the tube can have a lumen profile adapted to have an improved standard deviation in flow rate change. The standard deviation in flow rate change can be measured according to the Flow Rate Longevity Test, which includes pumping water through the tube at ambient conditions with no back pressure while subjecting the tube to repeated cycles of tube closure at a speed of about 600 rpm and measuring the flow rate at zero compression (i.e. fully open state) using a standard flow meter for at least 100 hours. The standard deviation in flow rate change is determined by calculating the standard deviation over the first 100 hours. In particular embodiments, the standard deviation in flow rate change of the tube can be no greater than 7%, or no greater than 5%, or no greater than 3%, according to the Flow Rate Longevity Test. In particular embodiments, the standard deviation in flow rate change of the tube can be at least 0.01% or at least greater than 0%, according to the Flow Rate Longevity Test. The minimum limits are only illustrative embodiments and do not limit the scope of the improved performance of the tube.

In certain embodiments, the tube 100 can be a flexible tube formed of an elastic material. In certain embodiments, the tube 100 can comprise a polymer. The polymer can comprise a thermoplastic polymer, a thermoset polymer, or both. In particular embodiments, the polymer is a thermoplastic polymer. In more particular embodiments, the polymer can include a polystyrene, a polyester, a silicone elastomer, a silicone copolymer, silicone thermoplastic vulcanizate, a copolyester, a polyamide, a fluoropolymer, a fluoroelastomer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a natural rubber, a nitrile rubber, a thermoplastic vulcanizate, an ionomer, a polyoxymethylene (POM), an acrylonitrile butadiene styrene (ABS), an acetal, an acrylic, a polyvinyl chloride (PVC), or a combination thereof.

In certain embodiments, the tube can include a single, monolithic sidewall having an essentially uniform composition. In further embodiments, the tube can include a plurality of sidewalls. In a particular embodiment, at least one of the plurality of sidewalls can overlie and encapsulate another of the plurality of sidewalls so as to form a multi-layer tube having a plurality of discrete layers. In further particular embodiments, the plurality of sidewalls can be formed of the same material or, in the alternative, at least one of the plurality of sidewalls can be formed of a material that is different from at least one other of the plurality of sidewalls.

The tube described herein can be used in various applications, including various applications within the fluid transport arts. For example, the tube described herein can be a subcomponent of a peristaltic pump or pump assembly. In another example, the tube described herein can be a subcomponent of a tube clamp assembly. In yet another example, the tube described herein can be a subcomponent of a gasket.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1

A tube comprising a sidewall defining a lumen profile, the sidewall comprising a plurality of alternating thin regions and thick regions, wherein the thin regions comprise elastic instabilities and the tube exhibits a closure stress, measured according to the Finite Element Analysis method, that is no greater than 0.94 times the Elastic Modulus E of the material forming the tube, as defined in ASTM D 412.

Embodiment 2

A tube comprising a sidewall defining a lumen profile, the lumen profile having a plurality of alternating increased radius regions and decreased radius regions, wherein the increased radius regions comprise elastic instabilities and the tube exhibits a closure stress, measured according to the Finite Element Analysis method, that is no greater than 0.94 times the Elastic Modulus E of the material forming the tube, as defined in ASTM D 412.

Embodiment 3

A tube comprising a sidewall defining an outer diameter, a lumen profile, and a thickness extending from the outer diameter to the lumen profile, wherein the sidewall comprises a non-uniform thickness such that when in a fully closed state, a thick region of the sidewall abuts a thin region of the sidewall.

Embodiment 4

A tube comprising a sidewall defining a lumen profile having a central axis A, wherein the lumen profile has a non-uniform radius such that when in a fully closed state, a large radius region abuts a small radius region.

Embodiment 5

The tube of any one of embodiments 1 and 3, wherein a lumen profile has a central axis A, wherein the lumen profile has a non-uniform radius such that when in a fully closed state, a large radius region abuts a small radius region.

Embodiment 6

The tube of any one of embodiments 2 and 4, wherein the sidewall has a non-uniform thickness such that, when in a fully closed state, a thick region of the sidewall abuts a thin region of the sidewall.

Embodiment 7

The tube of any one of the preceding embodiments, wherein the lumen profile comprises a central lumen profile.

Embodiment 8

The tube of any one of the preceding embodiments, wherein the tube has a length extending from a first end to a second end, and the lumen profile is essentially constant throughout the length of the tube.

Embodiment 9

The tube of any one of the preceding embodiments, wherein the inner profile is coaxial with the outer profile.

Embodiment 10

The tube of any one of the preceding embodiments, wherein the lumen profile is incongruous with the outer profile.

Embodiment 11

The tube of any one of the preceding embodiments, wherein the outer diameter has a diameter in a range of 0.2 to 1 cm, 0.3 to 0.95 cm, or 0.35 to 0.9 cm.

Embodiment 12

The tube of any one of the preceding embodiments, wherein the lumen profile includes has a non-uniform radius.

Embodiment 13

The tube of embodiment 12, wherein the non-uniform radius comprises a plurality of large radius regions and a plurality of small regions.

Embodiment 14

The tube of embodiment 13, wherein at least one large radius region is diametrically opposite at least one small radius region.

Embodiment 15

The tube of any one of embodiments 13 and 14, wherein the plurality of large radius regions, the plurality of small radius regions, or both, have a flat shape, a geometric shape, an arcuate shape, or an amorphous shape.

Embodiment 16

The tube of any one of embodiments 13 to 15, wherein the plurality of large radius regions have a concave shape having an apex extending away from the central axis.

Embodiment 17

The tube of any one of embodiments 13 to 16, wherein the plurality of small radius regions have a convex shape having an apex extending toward the central axis.

Embodiment 18

The tube of any one of embodiments 13 to 15, wherein the plurality of large radius regions have arcuate shape forming a rounded corner of a geometric shape of the lumen profile.

Embodiment 19

The tube of any one of embodiments 13 to 15 and 18, wherein the plurality of small radius regions have a flat shape forming a side of a geometric shape of the lumen profile.

Embodiment 20

The tube of any one of the preceding embodiments, wherein the lumen profile includes a plurality of large radius regions having a radius $R_1$ and a plurality of small radius regions having a radius $R_2$ that is no greater than 50% of the radius $R_1$, such as no greater than 30% of the radius $R_1$, or even no greater than 10% of the radius $R_1$.

Embodiment 21

The tube of any one of the preceding embodiments, wherein the lumen profile includes a plurality of large radius regions having a radius $R_1$ of at least 0.7 cm, at least 0.8 cm, or even at least 0.9 cm.

Embodiment 22

The tube of any one of the preceding embodiments, wherein the lumen profile includes a plurality of small radius regions having a radius $R_2$ of no greater than 0.4 cm, no greater than 0.3 cm, or even no greater than 0.2 cm.

Embodiment 23

The tube of any one of the preceding embodiments, wherein the sidewall has a non-uniform thickness.

Embodiment 24

The tube of embodiment 23, wherein the non-uniform thickness comprises a plurality of thick regions and a plurality of thin regions.

Embodiment 25

The tube of embodiment 24, wherein at least one thin region is diametrically opposite at least one thick region.

Embodiment 26

The tube of any one of embodiments 24 and 25, wherein the plurality of thin regions, the plurality of thick regions, or both, have a flat shape, a geometric shape, an arcuate shape, or an amorphous shape.

Embodiment 27

The tube of any one of embodiments 24 to 26, wherein the plurality of thin regions have a concave shape having an apex extending away from the central axis.

Embodiment 28

The tube of any one of embodiments 24 to 27, wherein the plurality of thick regions have a convex shape having an apex extending toward the central axis.

Embodiment 29

The tube of any one of embodiments 24 to 26, wherein the plurality of thin regions have arcuate shape forming a rounded corner of a geometric shape of the lumen profile.

Embodiment 30

The tube of any one of embodiments 24 to 26 and 29, wherein the plurality of thick radius regions have a flat shape forming a side of a geometric shape of the lumen profile.

Embodiment 31

The tube of any one of the preceding embodiments, wherein the sidewall includes a plurality of thin regions having a thickness $T_1$ and a plurality of thick regions having a thickness $T_2$, wherein the thickness $T_1$ is no greater than 50% of the thickness $T_2$, such as no greater than 30% of the thickness $T_2$, or even no greater than 10% of the thickness $T_2$.

Embodiment 32

The tube of any one of the preceding embodiments, wherein the sidewall includes a plurality of thin regions having a thickness $T_1$ of no greater than 0.06 cm, no greater than 0.05 cm, or even no greater than 0.04 cm.

Embodiment 33

The tube of any one of the preceding embodiments, wherein the sidewall includes a plurality of thick regions having a thickness $T_2$ of at least 0.2 cm, at least 0.3 cm, or even at least 0.35 cm.

Embodiment 34

The tube of any one of the preceding embodiments, wherein the sidewall has an average thickness $T_A$ in a range of about 0.1 cm to about 0.15 cm, such as in a range of about 0.12 cm to about 0.14 cm.

Embodiment 35

The tube of any one of the preceding embodiments, wherein the lumen profile has a wavy contour.

Embodiment 36

The tube of any one of the preceding embodiments, wherein the lumen profile has a geometric shape with rounded corners.

Embodiment 37

The tube of embodiment 36, wherein the geometric shape includes a triangle.

Embodiment 38

The tube of embodiment 36, wherein the geometric shape includes a square.

Embodiment 39

The tube of embodiment 36, wherein the geometric shape includes a nonagon.

Embodiment 40

The tube of any one of embodiments 13 to 39, wherein the sidewall or lumen profile includes an even number of alternating large radius and small radius regions or alternating thick and thin regions.

Embodiment 41

The tube of any one of embodiments 13 to 40, wherein the sidewall or lumen profile includes an odd number of alternating large radius and small radius regions or alternating thick and thin regions.

Embodiment 42

The tube of any one of embodiments 13 to 41, wherein the sidewall or lumen profile includes at least 3, at least 9, at least 15 or at least 25 alternating large radius and small radius regions or alternating thick and thin regions, or at least 4, at least 10, at least 16, or at least 24 alternating large radius and small radius regions or alternating thick and thin regions.

Embodiment 43

The tube of any one of the preceding embodiments, wherein the tube comprises a polymer.

Embodiment 44

The tube of any one of the preceding embodiments, wherein the tube comprises a silicone polymer.

Embodiment 45

The tube of any one of the preceding embodiments, wherein the tube comprises a thermoplastic polymer.

Embodiment 46

The tube of any one of the preceding embodiments, wherein the tube comprises a polymer including a polystyrene, a polyester, a silicone copolymer, silicone thermoplastic vulcanizate, a copolyester, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), or a combination thereof.

Embodiment 47

The tube of any one of the preceding embodiments, wherein the tube exhibits a closure stress, measured according to the Finite Element Analysis method, that is no greater than 0.96 times, no greater than 0.94 times, or no greater than 0.92 times the Elastic Modulus E of the material forming the tube, as defined in ASTM D 412.

Embodiment 48

The tube of any one of the preceding embodiments, wherein the tube exhibits a closure stress, measured according to the Finite Element Analysis method, that is at least 0.6 times, at least 0.65 times, or at least 0.7 times the Elastic Modulus E of the material forming the tube, as defined in ASTM D 412.

Embodiment 49

The tube of any one of the preceding embodiments, wherein the tube exhibits a closure stress, measured according to the Finite Element Analysis method, that is no greater than 96%, or no greater than 94%, or no greater than 92% of a closure stress of a circular reference tube.

Embodiment 50

The tube of any one of the preceding embodiments, wherein the tube exhibits a contact stress, measured according to the Finite Element Analysis method, that is no greater than 0.91 times, no greater than 0.85 times, or no greater than 0.73 times the Elastic Modulus E of the material forming the tube, as defined in ASTM D 412.

Embodiment 51

The tube of any one of the preceding embodiments, wherein the tube exhibits a contact stress, measured according to the Finite Element Analysis method, that is at least 0.5 times, at least 0.55 times, or at least 0.6 times the Elastic Modulus E of the material forming the tube, as defined in ASTM D 412.

Embodiment 52

The tube of any one of the preceding embodiments, wherein the tube exhibits a contact stress, measured according to the Finite Element Analysis method, that is no greater than 95%, or no greater than 89%, or no greater than 76% of the contact stress of the circular reference tube.

Embodiment 53

The tube of any one of the preceding embodiments, wherein the lumen profile is adapted to mitigate changes in at least one of the mechanical properties of the tube selected from closure stress, contact stress, flow rate stability, flow rate accuracy, standard deviation in flow rage change, or combinations thereof over the serviceable life of the tube.

Embodiment 54

The tube of any one of the preceding embodiments, wherein the tube has a standard deviation in flow rate change of no greater than about 7%, no greater than 5%, or no greater than 3%, as measured according to a Flow Rate Longevity Test.

Embodiment 55

The tube of any one of the preceding embodiments, wherein the tube has a flow rate stability of no greater than about 15%, no greater than about 10%, or no greater than about 5%, as measured according to a Flow Rate Stability Test.

Embodiment 56

The tube of any one of the preceding embodiments, wherein the tube has a flow rate accuracy of no greater than about 2.5%, no greater than 1%, or no greater than 0.2%, as measured according to a Flow Rate Accuracy Test.

Embodiment 57

The tube of any one of the preceding embodiments, wherein the tube is a multilayer tube.

Embodiment 58

A peristaltic pump subcomponent comprising the tube of any one of the preceding embodiments.

Embodiment 59

A peristaltic pump assembly comprising the peristaltic pump subcomponent of embodiment 58.

Embodiment 60

A tube clamp assembly comprising the tube of any one of embodiments 1 to 57.

Embodiment 61

A gasket comprising the tube of any one of embodiments 1 to 57.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A tube comprising a sidewall defining a lumen profile, the sidewall comprising a plurality of alternating thin regions and thick regions, wherein the thin regions comprise elastic instabilities, wherein the elastic instabilities comprise enlargements and reductions, wherein the enlargements are diametrically opposite to the reductions, wherein the thin regions have a sidewall thickness $T_1$ and the thick regions have a sidewall thickness $T_2$, wherein thickness $T_1$ is no greater than 50% of the thickness $T_2$, wherein the tube exhibits a closure stress, measured according to the Finite Element Analysis method, that is no greater than 0.94 times the Elastic Modulus E of the material forming the tube defined in ASTM D 412 in 2016, wherein the tube comprises an outer diameter having a circular shape, and wherein the tube exhibits a contact stress of at least 0.5 times and is no greater than 0.91 times the Elastic Modulus E of the material forming the tube.

2. The tube of claim 1, wherein a lumen profile has a central axis A, wherein the lumen profile has a non-uniform radius such that when in a fully closed state, a large radius region abuts a small radius region.

3. The tube of claim 1, wherein the tube has a length extending from a first end to a second end, and the lumen profile is essentially constant throughout the length of the tube.

4. The tube of claim 1, wherein the inner profile is coaxial with the outer profile.

5. The tube of claim 1, wherein the lumen profile is incongruous with the outer profile.

6. The tube of claim 1, wherein the outer diameter has a diameter in a range of 0.2 to 1 cm.

7. The tube of claim 1, wherein the lumen profile includes has a non-uniform radius.

8. The tube of claim 7, wherein the non-uniform radius comprises a plurality of large radius regions and a plurality of small regions.

9. The tube of claim 8, wherein at least one large radius region is diametrically opposite at least one small radius region.

10. The tube of claim 8, wherein the plurality of large radius regions, the plurality of small radius regions, or both, have a flat shape, a geometric shape, an arcuate shape, or an amorphous shape.

11. The tube of claim 8, wherein the plurality of large radius regions have a concave shape having an apex extending away from the central axis.

12. The tube of claim 8, wherein the plurality of small radius regions have a convex shape having an apex extending toward the central axis.

13. The tube of claim 8, wherein the plurality of large radius regions have arcuate shape forming a rounded corner of a geometric shape of the lumen profile.

14. The tube of claim 8, wherein the plurality of small radius regions have a flat shape forming a side of a geometric shape of the lumen profile.

15. The tube of claim 1, wherein the lumen profile includes a plurality of large radius regions having a radius $R_1$ and a plurality of small radius regions having a radius $R_2$ that is no greater than 50% of the radius $R_1$.

16. The tube of claim 1, wherein the sidewall includes a plurality of thin regions having a thickness $T_1$ and a plurality of thick regions having a thickness $T_2$, wherein the thickness $T_1$ is no greater than 50% of the thickness $T_2$.

17. The tube of claim 1, wherein the tube comprises a polymer including a polystyrene, a polyester, a silicone copolymer, silicone thermoplastic vulcanizate, a copolyester, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), or a combination thereof.

18. A tube comprising a sidewall defining a lumen profile, the lumen profile having a plurality of alternating increased radius regions and decreased radius regions, wherein the increased radius regions comprise elastic instabilities, wherein the elastic instabilities comprise enlargements and reductions, wherein the enlargements are diametrically opposite to the reductions, wherein the decreased radius regions have a sidewall thickness $T_1$ and the increased radius regions have a sidewall thickness $T_2$, wherein thickness $T_1$ is no greater than 50% of the thickness $T_2$, wherein the tube exhibits a closure stress, measured according to the Finite Element Analysis method, that is no greater than 0.94 times the Elastic Modulus E of the material forming the tube defined in ASTM D 412 in 2016, wherein the tube comprises an outer diameter having a circular shape, and wherein the tube exhibits a contact stress of at least 0.5 times and is no greater than 0.91 times the Elastic Modulus E of the material forming the tube.

19. The tube of claim 18, wherein the sidewall has a non-uniform thickness such that, when in a fully closed state, a thick region of the sidewall abuts a thin region of the sidewall.

20. A tube comprising a sidewall defining a lumen profile having a central axis A, wherein the lumen profile has a non-uniform radius such that when in a fully closed state, a large radius region abuts a small radius region, wherein the sidewall comprises elastic instabilities, wherein the elastic instabilities comprise enlargements and reductions, wherein the enlargements are diametrically opposite to the reductions, wherein the small radius region have a sidewall thickness $T_1$ and the large radius region have a sidewall thickness $T_2$, wherein thickness $T_1$ is no greater than 50% of the thickness $T_2$, wherein the tube exhibits a closure stress of not greater than 0.94 times the Elastic Modulus E of the material forming the tube, wherein the closure stress is measured according to the Finite Element Analysis method and the Elastic Modulus E of the material forming the tube is defined ASTM D 412 in 2016, wherein the tube comprises an outer diameter having a circular shape, and wherein the tube exhibits a contact stress of at least 0.5 times and is no greater than 0.91 times the Elastic Modulus E of the material forming the tube.

* * * * *

UNITED STATES PATENT AND TRADEMARK OFFICE
CERTIFICATE OF CORRECTION

PATENT NO. : 10,557,465 B2
APPLICATION NO. : 15/493402
DATED : February 11, 2020
INVENTOR(S) : Flavien Fremy et al.

Page 1 of 1

It is certified that error appears in the above-identified patent and that said Letters Patent is hereby corrected as shown below:

In the Claims

Column 17, Line 24, please delete "defined ASTM", and insert --defined in ASTM--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*